United States Patent
Binding et al.

(10) Patent No.: US 6,694,431 B1
(45) Date of Patent: Feb. 17, 2004

(54) PIGGY-BACKED KEY EXCHANGE PROTOCOL FOR PROVIDING SECURE, LOW-OVERHEAD BROWSER CONNECTIONS WHEN A SERVER WILL NOT USE A MESSAGE ENCODING SCHEME PROPOSED BY A CLIENT

(75) Inventors: Carl Binding, Thalwil (CH); Stefan Georg Hild, Adliswil (CH); Yen-Min Huang, Raleigh, NC (US); Luke James O'Connor, Adliswil (CH); Sandeep K. Singhal, Raleigh, NC (US); Victor John Shoup, Zurich (CH); Michael Steiner, Saarbruecken (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/416,100

(22) Filed: Oct. 12, 1999

(51) Int. Cl.[7] .................................................. H04L 9/00
(52) U.S. Cl. ....................... 713/160; 713/168; 713/170; 713/201
(58) Field of Search ................................. 713/160, 168, 713/171, 201

(56) References Cited

U.S. PATENT DOCUMENTS

| | | | | |
|---|---|---|---|---|
| 5,889,863 A | * | 3/1999 | Weber | 705/76 |
| 5,987,132 A | * | 11/1999 | Rowney | 705/77 |
| 6,052,718 A | * | 4/2000 | Gifford | 709/219 |
| 6,092,196 A | * | 7/2000 | Reiche | 713/200 |
| 6,189,030 B1 | * | 2/2001 | Kirsch et al. | 709/224 |
| 6,226,752 B1 | * | 5/2001 | Gupta et al. | 713/201 |
| 6,324,279 B1 | * | 11/2001 | Kalmanek et al. | 379/229 |
| 6,449,647 B1 | * | 9/2002 | Colby et al. | 709/226 |
| 6,466,966 B1 | * | 10/2002 | Kirsch et al. | 709/203 |

* cited by examiner

Primary Examiner—Gilberto Barron
Assistant Examiner—Kambiz Zand
(74) Attorney, Agent, or Firm—A. Bruce Clay; Marcia L. Doubet

(57) ABSTRACT

A method, system, and computer program product for establishing security parameters that are used to exchange data on a secure connection. A piggy-backed key exchange protocol is defined, with which these security parameters are advantageously exchanged. By piggy-backing the key exchange onto other already-required messages (such as a client's HTTP GET request, or the server's response thereto), the overhead associated with setting up a secure browser-to-server connection is minimized. This technique is defined for a number of different scenarios, where the client and server may or may not share an encoding scheme, and is designed to maintain the integrity of application layer communication protocols. In one scenario, a client proposes a message encoding scheme, but the server will not use this proposed scheme. The server proposes a different scheme, after which the client re-issues its request for secure content.

61 Claims, 3 Drawing Sheets

PIGGY-BACKED KEY EXCHANGE PROTOCOL FOR PROVIDING SECURE, LOW-OVERHEAD BROWSER CONNECTIONS WHEN A SERVER WILL NOT USE A MESSAGE ENCODING SCHEME PROPOSED BY A CLIENT

RELATED INVENTIONS

This application is related to the applications having Ser. No. 09/416,332 entitled "Piggy-Backed Key Exchange Protocol for Providing Secure, Low-Overhead Browser Connections to a Server with which a Client Shares a Message Encoding Scheme", Ser. No. 09/415,827 entitled "Piggy-Backed Key Exchange Protocol for Providing Secure, Low-Overhead Browser Connections from a Client to a Server using a Trusted Third Party", and Ser. No. 09/415,645 entitled "Piggy-Backed Key Exchange Protocol for Providing Secure, Low-Overhead Browser Connections When a Client Requests a Server to Propose a Message Encoding Scheme", all assigned to the same assignee and filed concurrently herewith on Oct. 12, 1999.

BACKGROUND OF THE INVENTION

1. Field of the Invention

The present invention relates to a computer system, and deals more particularly with a method, system, and computer program product for providing a piggy-backed key exchange protocol. This protocol is used between a client and server to establish security parameters that used to exchange data in a secure manner. By piggy-backing the key exchange onto other messages, the overhead associated with setting up a secure browser connection is reduced.

2. Description of the Related Art

Traditionally, complex distributed applications have been designed around the client/server paradigm, where the application logic is split into two integral parts. One of the parts provides the client functionality, and the other provides the server functions. Each of the parts is then installed on the respective hardware. Such an architecture has the fundamental drawback that the application usually must be tailored around a particular user device and vice versa: the application must function on the particular hardware and software profile of the intended user device, and the user device must meet the application requirements in terms of form-factor, processor requirements, storage capabilities, etc. This coupling leads to the implementation of the client functionality being fundamentally tied to a single type or class of end-user device. The client implementation typically must be modified in order to operate on different devices or operating system platforms, and separate versions must be provided to address the inherent differences in the devices and platforms. This leads to increased complexity and expense for application development and testing, distribution and support, etc. Because of the proliferation in client device types, it is becoming increasingly demanding to provide applications that reliably meet the constraints imposed by the different device types. This proliferation also creates a greater burden on end users who must similarly obtain and manage different versions of their application software, one for each type of device.

In the face of these challenges, there is a clear trend toward delivering applications to users in a form that is accessible via a more standard infrastructure that is available on most hardware and operating system platforms. One type of standard infrastructure is the browser. (Note that the browser implementation itself is generally non-portable, but the intent is to have the browser represent the only platform-specific code that developers write and that end users must deploy.) Within this standard infrastructure, application-specific content may be retrieved and presented to the user. Moreover, application-specific logic may be executed within an appropriate scripting environment provided on the client side by most browsers, including Netscape Navigator® and Internet Explorer. ("Netscape Navigator" is a registered trademark of Netscape Communications Corporation.) On some devices, the scripting environment may be separate from the browser, and may support richer (though still portable) application logic such as those applications written in the Java programming language. ("Java" is a trademark of Sun Microsystems, Inc.)

The trade off that comes from making the client infrastructure standard, however, is that it is also generic. That is, while the infrastructure is not written for the needs of a particular client application, it is able to act as the client for a wide range of applications. In this generic client environment, the problem of implementing each application shifts primarily toward the server side. (Hereinafter, the term "browser" will be used to refer to the generic client software, including the associated scripting and application environment(s).) This, in turn, somewhat complicates the tasks that must be implemented in the server software, as the server software must adapt the content to match the capabilities of the particular browser executing on the client. Alternatively, the burden may be shifted to one or more computers in the delivery chain between the client and server. In particular, a variety of transcoders and gateways can be envisaged in this delivery chain. Each of these transcoders and gateways may potentially have knowledge of a target client device's particularities, which the transcoder or gateway can then use to adjust data generated by a server application that is being delivered to this client. The Wireless Application Protocol, or "WAP," is an example of an application architecture which may employ this type of multiple transcoder and multiple gateway environment.

In such an environment where data is being transmitted between a client and server while passing through intermediate transcoders or gateways, data security is often a key concern. A client may need to send data to the server that is considered security-sensitive by the client or the server, such as when a person's credit card information is transmitted through a network for use by an electronic shopping application executing on the server. In addition, the content dispatched from the server to the client is often considered security-sensitive. A simple example of this situation is the same electronic shopping application just discussed, where the server may transmit an order confirmation to the client that includes the client's credit card information. Many other security-sensitive transmissions exist, such as those that occur when using electronic banking, online stock trading, online bill presentment and payment, etc. The problems that may ensue when sensitive data is exposed to an unintended recipient, such as a computer hacker, can be quite serious. While gateways, and transcoders in particular, may be designed to modify the application content in legitimate ways when forwarding it through the delivery chain, sensitive content at the same time must not be disclosed to such intermediaries. (U.S. patent application Ser. No. 09/352,534, which is titled "Method for Transmitting Information Data from a Sender to a Receiver via a Transcoder, Method of Transcoding Information Data, Method for Receiving Transcoded Information Data, Sender, Transcoder, and Receiver" and is assigned to the same assignee, defines a novel technique for use in such an environment where the security-sensitive portions of a Hypertext Markup Language, or HTML, document are encrypted while leaving the portions in plain text.

A number of security protocols have been developed for use in client/server and other networking environments. Examples include the SSL (Secure Sockets Layer), TLS (Transport Layer Security), and WTLS (Wireless Transport Layer Security) protocols. (TLS is being defined by the Internet Engineering Task Force as a follow-on replacement for SSL, and WTLS is being developed by the WAP Forum as a security protocol optimized for the mobile computing environment.) These protocols all share the characteristic of encrypting all data transmitted through a network connection or communication session, thereby preventing an intermediary, such as a transcoder, from inspecting and/or modifying any of the data being exchanged. Consequently, these transport-based security protocols are ineffective in environments having transcoders and gateways that must legitimately modify and therefore inspect some non-security-sensitive sections of the data stream.

To enable intermediaries to perform legitimate content modifications, end-to-end security in a complex delivery chain such as that described above must be provided at the application layer (referred to equivalently as the "application level") of the client and server. This means that security-related functions such as encryption, decryption, and authentication are performed under control of the application software, as only the application is able to distinguish between content that can be transmitted in plaintext (i.e. can be exposed to and acted upon by intermediaries) and content that is security sensitive and must be protected end-to-end (i.e. cannot be exposed to or acted upon by intermediaries). When application-level security is employed, the application invokes the services of specialized security software or tools to perform encryption, decryption, and authentication. Once the sensitive data has been encrypted at the application level, lower-layer functions of the system (such as the communications protocol stack, which is responsible for packetizing the content into messages, transmitting those messages to the destination, and re-assembling those messages into the original content) are unable to decrypt and modify that data. More importantly, such sensitive data also cannot be decrypted by the intermediate computers in the delivery chain, since these computers neither execute the application-level code shared by the client and server nor have access to the security keys and credentials used to encrypt the data. Similarly, the raw data corresponding to the encrypted content is not visible to hackers who might try to intercept it.

While an end-to-end security session established at the application layer provides advantageous security protection in the manner described above (i.e., allowing the secure exchange of information between application endpoints without being subject to decryption and/or modification by network intermediaries or hackers), application-layer security also imposes several drawbacks. First, a number of message exchanges may occur before a suitable set of parameters can be agreed upon. For example, security protocols require a key exchange phase where the client and server exchange and negotiate parameters such as the cipher suite and session key to be used during this security session. While this may be of little consequence when using high bandwidth, relatively inexpensive connections such as those provided in local area networks or the wired Internet, each message transmitted in a wireless environment such as SMS (Short Message Services) or USSD (Unstructured Supplementary Services Data) carries a rather high cost to the user. Thus, establishing the secure application-level session can be an expensive operation. Second, the message exchanges used to establish secure sessions are not easily encapsulated within existing application-layer protocols. These protocols consist of an already-defined set of primitives for communication between the client and server applications, and it is usually impossible to introduce the additional protocol primitives required for an application-level security parameter negotiation.

Accordingly, what is needed is a technique for establishing and maintaining end-to-end security sessions at the application level while maintaining the integrity of any application-layer communications protocol and without adding undue amounts of communications and message exchanges.

SUMMARY OF THE INVENTION

An object of the present invention is to provide a technique whereby a secure session can be established between a client browser and a server.

Another object of the present invention is to provide this technique whereby a minimal number of message exchanges are required to establish the secure session.

A further object of the present invention is to provide this technique whereby the session uses application-level security.

Yet another object of the present invention is to provide this technique whereby the integrity of any application-layer communications protocol is maintained.

A further object of the present invention is to provide this technique in a manner that is adaptable to a number of different client/server environments.

A further object of the present invention is to provide this technique using existing communication protocol messages.

Still another object of the present invention is to provide this technique when a server will not use a message encoding scheme proposed by a client.

Other objects and advantages of the present invention will be set forth in part in the description and in the drawings which follow and, in part, will be obvious from the description or may be learned by practice of the invention.

To achieve the foregoing objects, and in accordance with the purpose of the invention as broadly described herein, the present invention provides a method, system, and computer program product for use in a computing environment having a connection to a network, for establishing a secure, low-overhead connection between a client application (such as a browser) and a server application using existing message types. In one embodiment, this technique comprises: piggy-backing a first portion of security information onto a first message sent from the client application to the server application, wherein the first message uses a first existing message type; piggy-backing a second portion of security information onto a second message sent from the server application to the client application, wherein the second message uses a second existing message type; piggy-backing a third portion of security information onto a third message sent from the client application to the server application, wherein the third message uses the first existing message type; and piggy-backing a fourth portion of security information onto a fourth message sent from the server application to the client application, wherein the fourth message uses a third existing message type.

The first existing message type may be a HyperText Transfer Protocol (HTTP) or a Wireless Session Protocol (WSP) GET message, in which case the third existing message type is a response to the HTTP or WSP GET message. Or, the first existing message type may be an HTTP or a WSP POST message, in which case the third existing message type is a response to the HTTP or WSP POST message. The second existing message type may be an HTTP or WSP REDIRECT message, or a www-Authenticate message.

The server application will not use a message encoding scheme proposed by the client application. In a first aspect, the first message requests a secure page from the server application, wherein the request further comprises an identifier of the secure page; the second message sends a redirection message from the server application to the client application, wherein the redirection message comprises a redirected identifier of the secure page; the third message sends a subsequent request for the secure page from the server application in response to the redirection message, wherein the subsequent request further comprises the redirected identifier of the secure page; and the fourth message sends a response to the subsequent secure page request to the client application, wherein the response further comprises a content portion encrypted using a session key generated by the server application. In a second aspect, the second message sends an authentication message from the server application to the client application instead of sending the redirection message, and the third message sends a subsequent request for the secure page from the server application in response to this authentication message. The authentication message may comprise a redirected identifier of the secure page, and the subsequent request further may comprises this redirected identifier.

In both aspects, the first portion may further comprise a first set of information encrypted using a public key of a trusted third party (TTP); the second portion may further comprise a security certificate or an identifier of the server; the third portion may further comprise a second set of information encrypted using a public key of the server; and the response may further comprises a nonce of the server application, encrypted using a public key of the client application.

The first set of information preferably comprises: zero or more parameters required for the secure page request; an identification of the client application; an identification of the server application; an identification of the TTP; a client nonce; and optionally including a timestamp. The second set of information preferably comprises: zero or more parameters required for the subsequent secure page request; the identification of the client application; the client nonce; and the timestamp when the first set includes the timestamp.

Or, the first set of information may be encrypted using the public key of the server application or a session key known to the client application instead of using the public key of the TTP. In this case, the first set of information omits the identification of the server application and the identification of the TTP.

The redirected identifier of the secure page may be identical to the identifier of the secure page.

The present invention will now be described with reference to the following drawings, in which like reference numbers denote the same element throughout.

DESCRIPTION OF THE PREFERRED EMBODIMENT

Figure 1:
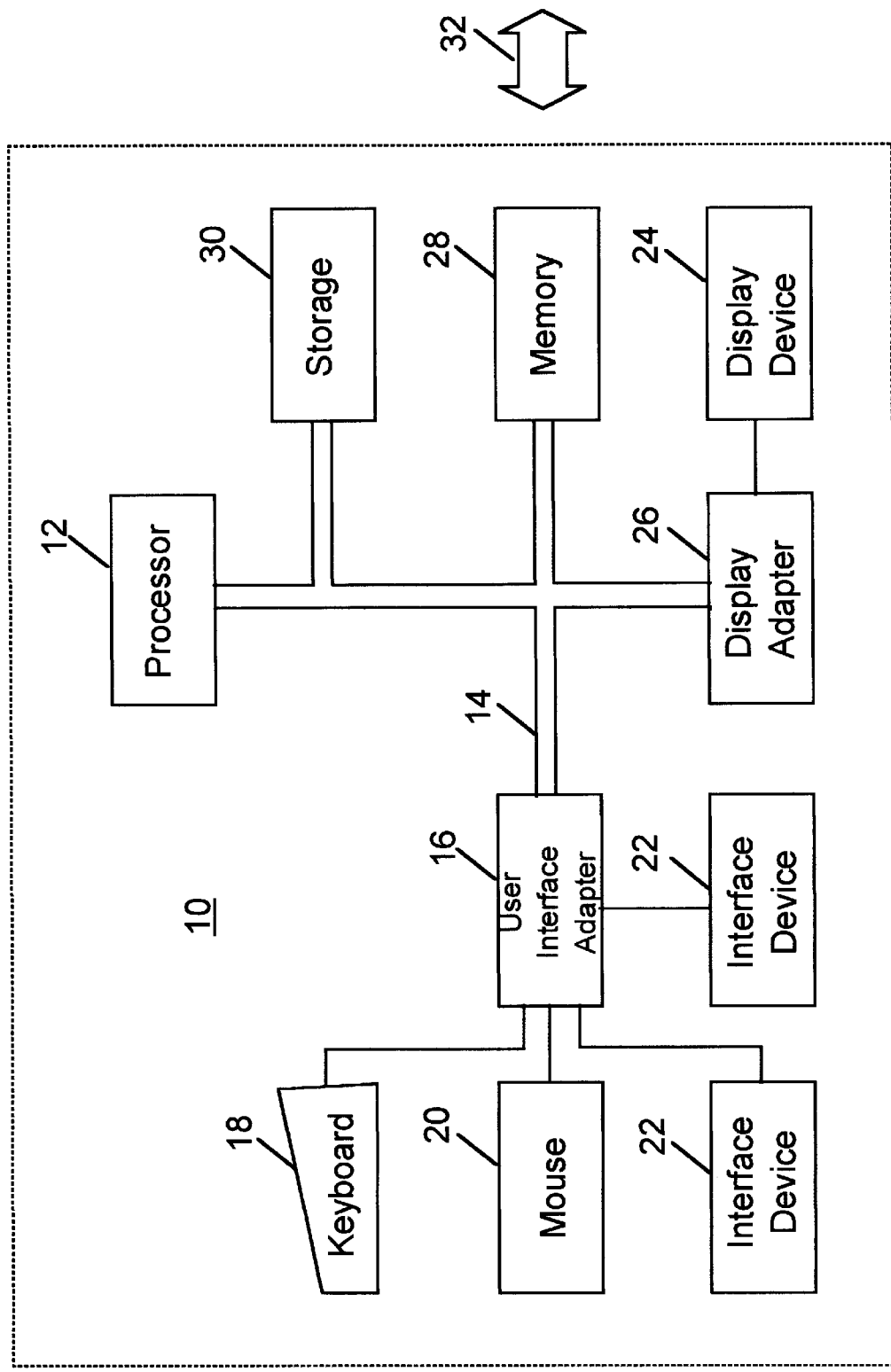
FIG. 1 is a block diagram of a computer workstation environment in which the present invention may be practiced.

FIG. 1 illustrates a representative workstation hardware environment in which the present invention may be practiced. The environment of FIG. 1 comprises a representative single user computer workstation 10, such as a personal computer, including related peripheral devices. The workstation 10 includes a microprocessor 12 and a bus 14 employed to connect and enable communication between the microprocessor 12 and the components of the workstation 10 in accordance with known techniques. The workstation 10 typically includes a user interface adapter 16, which connects the microprocessor 12 via the bus 14 to one or more interface devices, such as a keyboard 18, mouse 20, and/or other interface devices 22, which can be any user interface device, such as a touch sensitive screen, digitized entry pad, etc. The bus 14 also connects a display device 24, such as an LCD screen or monitor, to the microprocessor 12 via a display adapter 26. The bus 14 also connects the microprocessor 12 to memory 28 and long-term storage 30 which can include a hard drive, diskette drive, tape drive, etc.

The workstation 10 may communicate with other computers or networks of computers, for example via a communications channel or modem 32. Alternatively, the workstation 10 may communicate using a wireless interface at 32, such as a CDPD (cellular digital packet data) card. The workstation 10 may be associated with such other computers in a local area network (LAN) or a wide area network (WAN), or the workstation 10 can be a client in a client/server arrangement with another computer, etc. All of these configurations, as well as the appropriate communications hardware and software, are known in the art.

Figure 2:
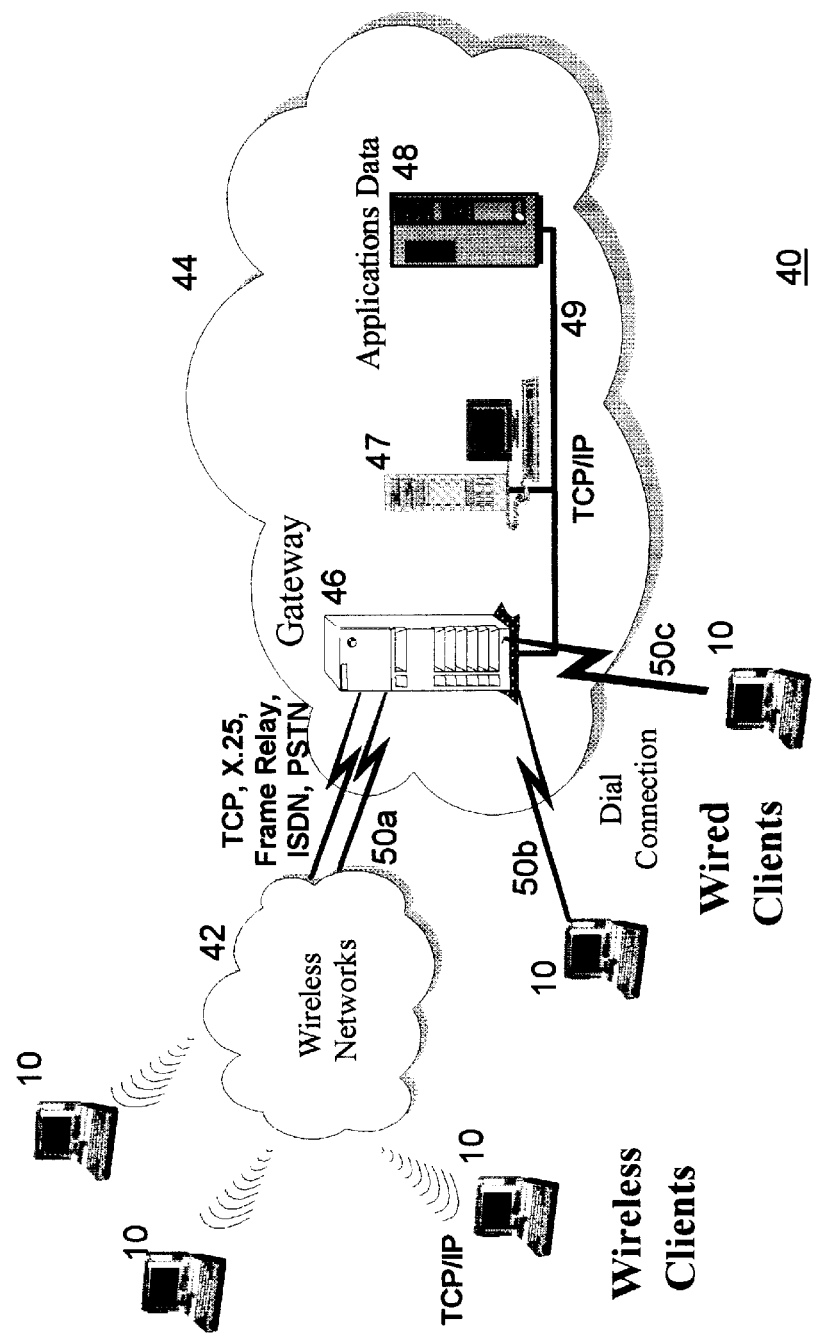
FIG. 2 is a diagram of a networked computing environment in which the present invention may be practiced.

FIG. 2 illustrates a data processing network 40 in which the present invention may be practiced. The data processing network 40 may include a plurality of individual networks, such as wireless network 42 and network 44, each of which may include a plurality of individual workstations 10. Additionally, as those skilled in the art will appreciate, one or more LANs may be included (not shown), where a LAN may comprise a plurality of intelligent workstations coupled to a host processor.

Still referring to FIG. 2, the networks 42 and 44 may also include mainframe computers or servers, such as a gateway computer 46 or application server 47 (which may access a data repository 48). A gateway computer 46 serves as a point of entry into each network 44. The gateway 46 may be preferably coupled to another network 42 by means of a communications link 50a. The gateway 46 may also be directly coupled to one or more workstations 10 using a communications link 50b, 50c. The gateway computer 46 may be implemented utilizing an Enterprise Systems Architecture/370 available from IBM, an Enterprise Systems Architecture/390 computer, etc. Depending on the application, a midrange computer, such as an Application System/400 (also known as an AS/400) may be employed. ("Enterprise Systems Architecture/370" is a trademark of IBM; "Enterprise Systems Architecture/390", "Application System/400", and "AS/400" are registered trademarks of IBM.)

The gateway computer 46 may also be coupled 49 to a storage device (such as data repository 48). Further, the gateway 46 may be directly or indirectly coupled to one or more workstations 10.

Those skilled in the art will appreciate that the gateway computer 46 may be located a great geographic distance from the network 42, and similarly, the workstations 10 may be located a substantial distance from the networks 42 and 44. For example, the network 42 may be located in California, while the gateway 46 may be located in Texas, and one or more of the workstations 10 may be located in New York. The workstations 10 may connect to the wireless network 42 using a networking protocol such as the Transmission Control Protocol/Internet Protocol ("TCP/IP") over a number of alternative connection media, such as cellular phone, radio frequency networks, satellite networks, etc. The wireless network 42 preferably connects to the gateway 46 using a network connection 50a such as TCP or UDP (User Datagram Protocol) over IP, X25, Frame Relay, ISDN (Integrated Services Digital Network), PSTN (Public Switched Telephone Network), etc. The workstations 10 may alternatively connect directly to the gateway 46 using dial connections 50b or 50c. Further, the wireless network 42 and network 44 may connect to one or more other networks (not shown), in an analogous manner to that depicted in FIG. 2.

Software programming code which embodies the present invention is typically accessed by the microprocessor 12 of the workstation 10 and server 47 from long-term storage media 30 of some type, such as a CD-ROM drive or hard drive. The software programming code may be embodied on any of a variety of known media for use with a data processing system, such as a diskette, hard drive, or CD-ROM. The code may be distributed on such media, or may be distributed to users from the memory or storage of one computer system over a network of some type to other computer systems for use by users of such other systems. Alternatively, the programming code may be embodied in the memory 28, and accessed by the microprocessor 12 using the bus 14. The techniques and methods for embodying software programming code in memory, on physical media, and/or distributing software code via networks are well known and will not be further discussed herein.

A user of the present invention at a client computer may connect his computer to a server using a wireline connection, or a wireless connection. Wireline connections are those that use physical media such as cables and telephone lines, whereas wireless connections use media such as satellite links, radio frequency waves, and infrared waves. Many connection techniques can be used with these various media, such as: using the computer's modem to establish a connection over a telephone line; using a LAN card such as Token Ring or Ethernet; using a cellular modem to establish a wireless connection; etc. The user's computer may be any type of computer processor, including laptops, handheld or mobile computers; vehicle-mounted devices; desktop computers; mainframe computers; etc., having processing and communication capabilities. The remote server, similarly, can be one of any number of different types of computer which have processing and communication capabilities. These techniques are well known in the art, and the hardware devices and software which enable their use are readily available. Hereinafter, the user's computer will be referred to equivalently as a "workstation," "device," or "computer," and use of any of these terms or the term "server" refers to any of the types of computing devices described above.

In the various alternative preferred embodiments, the present invention may be implemented as one or more modules (also referred to as code subroutines, or "objects" in object-oriented programming) of one or more computer software programs. Alternatively, the logic of the present invention may be implemented in hardware or firmware, which is accessed by the executing software of an application program. Regardless of the physical form in which the implementation is embodied, the embodiment will be located on the client workstation and on the server, preferably as server-specific and client-specific parts. (Alternatively, it may be desirable in a particular situation to provide a single implementation which embodies both client and server capabilities.) When implemented in software, the logic implementing the technique of the present invention may be integrated with the code of an application program (including a browser application executing on a client), or it may be implemented as one or more separate utility modules, which provide services that are invoked by such a program, without deviating from the inventive concepts disclosed herein. The server machine or process may be functioning as a Web server or process, where the Web server or process provides services in response to requests from a client connected through the Internet. Alternatively, the server machine or process may be in a corporate intranet or extranet of which the client's workstation is a component, or in any other network environment.

The present invention provides several alternative techniques for establishing a secure, low-overhead connection between a browser operating on a client workstation and a server. A number of alternative embodiments are disclosed, which are adapted to various client/server environments. Use of the invention is particularly advantageous in wireless environments, where each message transmission is a relatively expensive operation. Further, the invention is advantageously used where messages are transmitted through one or more gateways or transcoders. Because the present invention uses application-level security, message content that is not considered sensitive from the application perspective can be made visible to these intermediaries, enabling legitimate modifications (such as filtering message content by a transcoder) to occur while still preventing access to sensitive information that will have been encrypted by the application.

The present invention achieves low-overhead secure connections using standard, existing messages of the HTTP or WSP protocols. Thus, the expense and difficulty of attempting to integrate new message types into the implementations of well-established communication protocols is avoided. The novel manner in which the overhead of establishing the secure connection is reduced is to piggy-back the key exchange protocol defined herein onto the initial message transmissions between a client and server, as will now be described.

A common browser request using the HTTP protocol is a "GET" message sent from the client to the server. Typically, a GET message specifies a Uniform Resource Locator (URL) of a requested Web page and may contain other information such as: parameters to be used for dynamically generating some portion of the requested content; identifying information about the requesting client; the type of hardware on which the client application is executing; etc. Upon receiving this GET request, the server responds by either sending the requested content, redirecting the client to some other page location, or perhaps returning an error message for various reasons. Another message type commonly sent by a browser is a "POST" message. A POST message also specifies a URL, but instead of requesting content stored at the URL location (as in the case of a GET message), a POST message includes the content to be stored at the specified URL. These concepts are well known in the art, and use standard HTTP messages. While the discussions herein are in terms of using HTTP GET messages, it is to be understood that the inventive techniques described apply also to HTTP POST messages and to any other message type (including message types defined in protocols other than HTTP, such as WSP) having analogous semantics.

Often, the content that has been requested by the client will be considered security-sensitive. In addition, the parameters or other information the client sends to the server (such as a client password) may be security-sensitive. (Hereinafter, the term "parameters" is intended to refer to any type of security-sensitive information the client transmits to the server.) Therefore, it is necessary to protect the data by encryption before transmitting it through the network. In order that the intended recipient (that is, the client in the case of encrypted content, or the server in the case of encrypted parameters) can then decrypt the transmitted information, the parties must establish a common security session. In particular, the client and server must agree on the cipher suite to be used and the session key for use with this suite. As stated previously, existing security protocols such as SSL require a number of message exchanges for negotiating this information between a particular client and server. The present invention, on the other hand, optimizes message transmission by piggy-backing such information onto already-required HTTP (or WSP) message flows. In particular, the initial client GET request may be used to transmit parameters securely, along with the request for a particular Web page, and the server's first response to this request may be used to securely transmit the requested content, in the novel manner to be discussed. Thus, the secure exchange of information may require no more messages (and no new message types) beyond what is already required for a non-secure exchange.

A number of symbols to be used in the description of the preferred embodiments will now be defined.

M("msg") is the encoding of some message, "msg," using a particular message encoding scheme "M," such that (1) only the expected sender and intended recipient can retrieve "msg," and (2) both can verify the correctness of "msg," i.e. that the retrieved "msg" is in fact the same "msg" that had been sent by the sender. These are the properties of privacy (provided by encryption techniques) and authenticity (provided by authentication techniques), respectively.

meta-M is the meta-information or description of message encoding scheme M meta-M may be encrypted information, such that only the intended recipient can construct M as a valid message encoding scheme between the sender and receiver. As used herein, the term "meta-M" refers to a particular encoding scheme M and the key that is to be used with M.

Cert(X) refers to the certificate of party X. A digital certificate is a data structure that includes sufficient information to enable authentication of the certificate owner's identity. In particular, a certificate created for use with public key cryptography includes the certificate owner's public key and identification of an encryption algorithm that may be used when sending encrypted messages to this owner. These concepts are well known in the art.

ID(X) is the identity of party X. The manner in which a party is identified does not form part of the present invention, and any appropriate technique may be used without deviating from the inventive concepts disclosed herein.

p(X) is the public key of party X.

q(X) is the private key of party X.

$Enc_k(m)$ is the encryption of message m, under encryption key k. Hence, $Enc_{p(X)}(m)$ is a public-key encryption of message m using the public key of party X, and $Enc_k(m)$ is a private or shared-key encryption of message m using the shared key k.

T is a timestamp.

N is a nonce (e.g. a value created by a random number generator), typically used in public key authentication. According to the SSL key exchange protocol, for example, each party (client and server) generates a nonce, and sends it to the other party. Each receiver then digitally signs the nonce provided by the other party, using a private key associated with a public certificate. Each party then sends that public certificate and the signed nonce back to the other party. Each party then validates the digital signature on the nonce using the public key associated with the other party's certificate. In this manner, each party is able to authenticate the identity of the other. Because the nonce is generated randomly within each session, it can be used to minimize the possibility of a successful replay attack.

N(c) is a client-generated nonce, and N(s) is a server-generated nonce.

Using the symbols defined above, transmission of an encrypted message from one party X to another party Y is then represented abstractly as:

X→Y: M("msg")

(Note that the message flows depicted herein do not specify the non-security-sensitive message content, such as formatting information that may be carried as part of a server response, as this type of information is not pertinent to the present invention.)

When public key cryptography is used for M, then this abstract message flow may be concretely implemented as:

X→Y: $Enc_{p(Y)}$("msg")

which indicates that X has sent a message to Y which was first encrypted using Y's public key.

When private (shared) key cryptography is used for M, on the other hand, this abstract message flow may be concretely implemented as:

X→Y: $Enc_k$("msg")

which indicates that X has sent a message to Y which was first encrypted using a previously-exchanged and exclusively-shared key k (according to the requirements of private key cryptography).

The manner in which one party X informs another party Y of the message encoding scheme M that X wishes to use for secure communications may be represented abstractly as follows:

X→Y: meta-M

In other words, X informs Y of the encoding scheme M that X wishes to use for transmitting secure messages by transmitting meta-information "meta-M."

The public key representation of this exchange of encoding scheme information then may be:

X→Y: Cert(X)

where X sends his certificate to Y, a message that Y may interpret to mean that X intends the parties to use each other's public keys as encryption keys, using public key cryptography. (As is well known in the art, techniques exist that would enable Y to retrieve X's certificate and public key independently from other sources, such as by accessing a certificate registry.)

When using a shared (i.e. private) key for message encoding, a possible analogous concrete transmission might be:

$X \rightarrow Y$: $Enc_{p(Y)}(k)$ where X sends the shared secret key, k, to Y after encrypting the key using Y's public key, p(Y). (Alternatively, the parties may exchange the shared secret key in other ways which do not require a network transmission, as is well known in the art.)

In addition to or instead of sending this public key or private key information as meta-M, the transmission may specify the cipher suite (such as the Data Encryption Standard, commonly referred to as "DES") to be used. When using public key cryptography, the sender's certificate may be used as the meta-information transmitted, where the certificate (by definition) specifies both an encryption algorithm and the sender's public key.

Timestamps, nonces, and/or various identifiers are usually included in security-protected messages in order to avoid a range of possible attacks. Timestamps and nonces can be used to avoid replay attacks and to increase the cryptographic strength of a cipher and thereby avoid brute force attacks. The preferred embodiments discussed below provide for optionally using one or more of these values.

The flows of the preferred embodiments are depicted below as using client nonces and server nonces, as a technique for enabling both the client and server to contribute part of a shared session key. By using input of both parties to generate the session key, and then using this shared key to encrypt session data, security is increased beyond what would be achieved if a single party generated such a key (where an error-prone implementation of that single party might reuse the same key value repeatedly, leading to a security exposure). It will be obvious to one of ordinary skill in the art how the flows may be changed if nonces are not used (for example, by encoding transmitted data using the recipient's public key).

Figure 3:
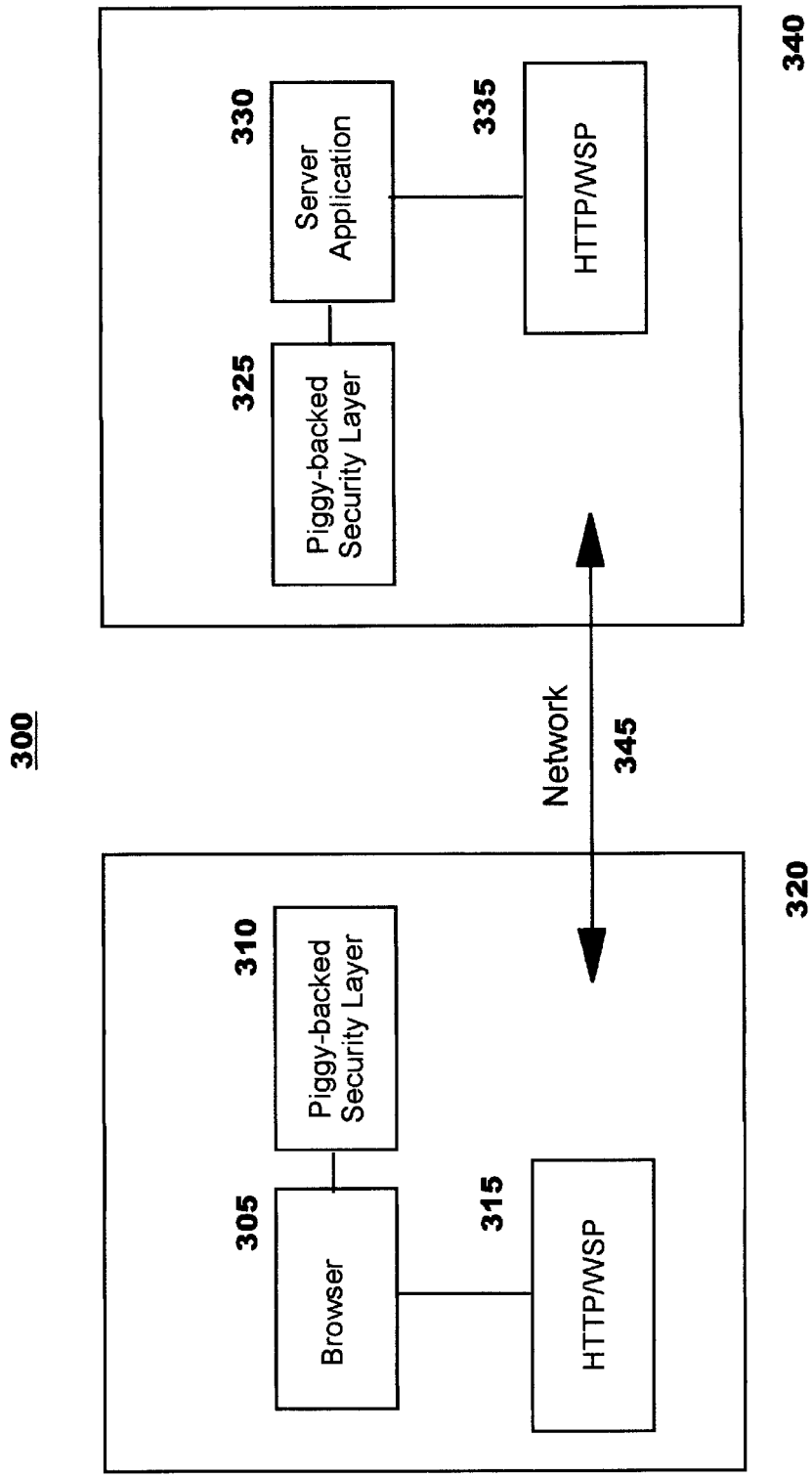
FIG. 3 illustrates the basic architecture of a system in which the preferred embodiment is being used.

FIG. 3 depicts the basic architecture of a system 300 in which the preferred embodiments of the present invention are being used. A client browser 305 (or other client application) is installed on, and operating on, a client device 320. This browser 305 operates at the application, or upper, layer of the software stack. An HTTP or WSP communications protocol engine operates as a lower layer in the client device 320 (see element 315), as well as in the server 340 (see element 335). A network connection 345, which may pass through a number of gateways and/or transcoders (not shown), connects the client's communications protocol engine 315 to the server's corresponding communications protocol engine 335. A server application 330 operates at the application layer of the server 340. The embodiment of the present invention is situated logically at the application layer where it can be invoked by the software 305 or 330, as shown at elements 310 and 325. Note that the present invention may be implemented using a client-side HTTP proxy with a security plug-in which handles encryption and decryption for client-side HTTP applications. This approach, not shown in FIG. 3, is particularly advantageous when the client application 305 cannot be modified to directly invoke the functions of the security layer 310.

The present invention may be used advantageously in a number of different scenarios, wherein the client and server have varying degrees of knowledge about each other and varying degrees of commonality with respect to message encoding schemes. Four different scenarios will now be described, along with a different preferred embodiment of the present invention that is specifically adapted for use in that scenario. Each preferred embodiment provides an independent technique for securely transmitting and receiving content, and an implementation of the present invention may provide support for one or more of these embodiments, as appropriate to the environment in which the implementation will operate.

An optional optimization may be used for each of these embodiments, whereby the sending of a message under some existing shared message encoding scheme M is equivalent to sending the same message encoded under another, not-yet-shared encoding scheme Mx, provided that a description of Mx (i.e. meta-Mx) is also transmitted. The meta-Mx information is encoded according to the existing shared scheme M. This optimization is represented abstractly as:

$X \rightarrow Y$: M("msg") is cryptographically equivalent to $X \rightarrow Y$: M(meta-Mx), Mx("msg")

As an example of when this optimization may be desirable (for any of the preferred embodiments), suppose the encoding scheme M shared by the client and server is a relatively expensive public key technique (either in terms of computational requirements or bandwidth utilization, or both). If a large amount of data is to be transmitted, using this encoding scheme will typically be undesirable because of the prohibitive (computational and/or bandwidth) cost. As an alternative, one of the parties may propose using a simpler shared-key encoding scheme such as the Data Encryption Standard (DES) algorithm. Mx, in this case, is DES, and thus Mx("msg") refers to the message encoded using DES. M(meta-Mx) is then an indication, encoded using the "expensive" technique M, that DES is to be used for encrypting and decrypting the message. M(meta-Mx) may further comprise an encoding of the key to be used with the proposed Mx scheme, if an appropriate key is not already shared by (or otherwise available to) the parties.

First Preferred Embodiment

In a first scenario, the client and server share a common message encoding scheme, M. In this scenario, it is assumed that both the client's and the server's certificates are available to both parties if public key cryptography is being used. When using private key security, it is assumed that both parties possess the shared key. The novel piggy-backed key exchange protocol of this first preferred embodiment wherein the client requests a Web page (referred to simply as a "page," for ease of illustration) and the server transmits the requested content is represented abstractly for this scenario as follows:

Client→Server: GET "page", M("parameters", . . . )

Server→Client: M("content", . . . )

The first of these two flows indicates that the client sends an HTTP GET request for a page located at a particular URL "page," along with parameters (and perhaps other information) that have been encrypted according to the shared scheme M and piggy-backed onto the GET message. (In the preferred embodiment, these encrypted parameters are transmitted in the GET message in separate request headers, however, it is to be understood that the encrypted parameters may be transmitted in many other ways without deviating from the inventive concepts disclosed herein, such as by appending them to the requested URL.) In this manner, the security-sensitive parameters are protected from exposure to an unintended recipient (including any intermediaries in the delivery chain). As will be obvious, the server is able to decrypt the parameters to use in servicing the client's request only if this server is the intended recipient of the GET message.

Note that the flows depicted herein show use of parameters with GET requests. It is to be understood that these parameters may be omitted when a particular page request does not require parameterized information, without deviating from the inventive concepts disclosed herein. Further, it is to be understood that the order of the elements (such as identifiers, nonces, and timestamps) depicted on messages herein may be altered without deviating from the concepts of the present invention.

The second flow indicates that the server returns the requested message content, designated simply as "content," after encrypting it using the same shared scheme M. Thus, the privacy of the content is also protected, and the client will be able to decrypt this protected content only by using the appropriate key (that is, the shared key in a private key system, or the client's private key in a public key system).

Message authentication may optionally be performed by the receiver of each of these messages (and the messages described in the following scenarios as well) following the decryption of the message. The authentication process ensures that the message came from the party who claims to be the originator. Techniques for performing encryption, decryption, and authentication are well known in the art and do not form part of the present invention.

An example of using this novel piggy-backed key exchange protocol with public key cryptography is then:

Client→Server: GET "page", $Enc_{p(Server)}$(ID(Client), ID(Server), N(Client), T),
$Enc_{q(Client)}$(ID(Client), ID(Server), N(Client), T),
$Enc_{N(Client)}$("parameters", ID(Client), T)

Server→Client: $Enc_k$("content"), ID(Server), N(Server)

The GET message, with which the client requests Web content, preferably uses three sets of encrypted information in this embodiment. The first is encrypted by the client using the server's public key and comprises identifying information about the client itself and the server, the client's own nonce, and a timestamp. (As stated earlier, this identifying information may be specified in various forms, provided that this form enables the respective parties to use the identifier to locate information such as the certificate of the identified party. For example, the identifier may be used as an index into a database of stored certificates, or a database of stored public keys. Or, the identifying information may be the certificate itself In addition to using the identifying information for certificate or public key retrieval, the party receiving the identifier of another party may subsequently use that identifier in determining where to send a response.) Next, the client encrypts the same information using its own private key. The third set of encrypted information comprises the parameters that the client is securely sending to the server, the identifying information about the client, and the timestamp. This third set of information is encrypted using the client's nonce.

Upon receipt of this request and the security information piggy-backed onto it, the server decrypts the encrypted data, and optionally authenticates it as discussed above. The data encrypted using the server's public key (described above as the "first set" of encrypted information) is decrypted using the server's private key. The data that was encrypted using the client's private key (the "second set") is decrypted using the client's public key. The data that was encrypted using the client's nonce is then decrypted using the client nonce that has been obtained from decrypting either the first or second set of data.

The optional timestamp which has been shown in the message flows of this embodiment, as well as the other embodiments below, may be used by the server to avoid replay attacks (whereby, e.g., the server compares the timestamp to the current time at which the request was received and discards the request if this comparison indicates that some predetermined time period has elapsed).

Assuming that the server's decryption and optional authentication and timestamp verification procedures complete successfully (and no other error situations arise), the server then encrypts the requested content using shared session key k. (Alternatively, as will be obvious, the server could use the client's public key to encrypt the requested content. In this case, the client would be able to decrypt the content using its private key, provided that the receiving client was the intended recipient.) This encrypted content is returned to the client, along with the server's identifying information and the server's nonce.

The session key k which the server uses to encrypt the sensitive content may be generated using some shared function, f, as follows:

k=f (N(Client), N(Server))

where the client-contributed nonce (which the server obtains upon successfully decrypting the GET message, above) and the server's own nonce (which is then returned to the client in the server's response message) are both used in computing the session key. The server computes the key prior to encrypting the content, and the client then uses the same nonces to compute its own version of the key for use in decrypting the content. As will be obvious, the receiving client will compute the same key value used by the server only if it is the intended client. A benefit of using a shared key to encrypt and decrypt session data is that encryption algorithms using keys of this type are typically much less expensive in terms of computation than public-key encryption techniques. Alternatively, an implementation of any of the preferred embodiments may substitute public key encodings for those shown herein as using shared keys without deviating from the scope of the present invention.

Alternatively, the client and server may have already exchanged a session key, which they may then use for subsequent message exchanges using private key techniques. In this situation, the piggy-backed key exchange protocol is:

Client→Server: GET "page", $Enc_k$("parameters", ID(Client), T, N(Client))

Server→Client: $Enc_{k(new)}$("content"), $Enc_k$(N(Server))

As can be seen by comparing the first of these two messages with the corresponding message used for the public key approach, the client is not required to send the first and second sets of encrypted information but instead sends only the parameters, client identifier, timestamp, and now the client nonce as well, all encrypted using the shared key k. The server then decrypts this information (as has been described) and uses the decrypted client nonce with the server's own nonce to compute a new session key (using a shared function, f, also as described above). This new session key is then used to encrypt the server's response, and is represented in the second message as "k(new)." The server then encrypts its nonce using the original shared session key k, so that only this client will be able to decrypt the nonce properly. Once the client has decrypted the server's nonce, the client computes its own version of the new session key, and uses this new key to decrypt the message content. (Alternatively, the client's public key could be used to encrypt the server's nonce instead of using shared key k.)

Second Preferred Embodiment

In a second scenario, the client and server do not have a common message encoding scheme with each other. They do, however, each share an encoding scheme with some trusted third party (TTP). This is the situation frequently encountered in mobile communication systems, where a central database is utilized to administer the sign-on of mobile clients into the system. For example, such a central database may be incorporated into the central subscriber management system of cellular mobile communication networks such as GSM (Global System for Mobile communication), CDMA (Code-Division Multiple Access), PHS (Personal Handyphone System), etc. Being connected via a separate data communication network, such as the wired Internet, it is safe to assume that any traffic between the server and the TTP in this scenario travels over an established secure connection and is therefore not bound by the same restrictions as between the client and server or between the client and the TTP. (Accordingly, there is no pressing need to minimize the size of message transmissions between the server and the TTP.)

For the flows depicted below in this second scenario, the message encoding scheme shared between the client and TTP is referred to as M1, and the encoding scheme shared between the server and TTP is referred to as M2. A third encoding scheme is then preferably established between the client and server, referred to as M3. Each of the encoding schemes has the properties described previously for scheme M. Further, because M3 is being established dynamically, it becomes necessary to transmit the meta-information, meta-M3, which describes the scheme to be used.

The novel key exchange protocol of this second preferred embodiment, wherein secure information transmission to (respectively, retrieval from) a server is provided by piggy-backing security parameters onto existing message flows, is shown abstractly by the following sequence:

Client→Server: GET "page", M1("parameters", . . . )
Server→TTP: M2(M1("parameters", . . . ))
TTP→Server: M2("parameters", . . . )
Server→Client: M3("content", . . . ), meta-M3

The first of these four flows is the client's request for a particular Web page. The client encrypts its security-sensitive parameters using encoding scheme M1, which it shares with the TTP. Upon receiving this message, the server determines that it is unable to process the encrypted parameters, as it does not understand (or perhaps does not have code that implements) M1. Thus, the server forwards the message on to the TTP, after first encrypting the parameters yet again, this time with the encoding scheme M2 shared by both the server and the TTP. This corresponds to the second flow shown above. Assuming the TTP successfully decrypts the message using M2, and also understands and implements M1, the TTP will then perform a second decryption using M1. This makes the parameters available to the TTP. In the mobile communication example discussed above, the parameters may contain information about the user of the client device, such as his account number with the mobile service. In this situation, the TTP would typically check the account number, ensuring inter alia that the subscriber's account is not delinquent. Assuming the TTP successfully completes its decryption process, and any other checks such as this account verification, the TTP will then re-encrypt the parameter information in a form the server can use. In this example where the server and TTP both share the M2 encoding scheme, the TTP uses M2 to encrypt the parameters, and then returns them to the server (shown above as the third flow). The server is now able to decrypt the parameters, and uses them to create the requested content, in the same manner discussed earlier for the first preferred embodiment. In the final flow shown above, the server transmits the requested content, after first encrypting it using some new scheme M3, where the meta-information describing M3 is piggy-backed onto the transmitted content response to the client. The client, upon receiving the message, uses meta-M3 to determine how to decrypt the transmitted Web content. (Note that when the server encodes meta-M3 properly, only the intended client will be able to decrypt meta-M3, and thus the message content as well.)

Note that while four message exchanges are used in this scenario, only two are between the client and server, and thus the overhead associated with the browser connection is not adversely increased. In addition, once this exchange has occurred for a particular client and server, the encoding scheme M3 remains available for future communications between them. In that case, they now have a shared encoding scheme, and may proceed according to the first preferred embodiment. As will be obvious to one of skill in the art, the server's response could be transmitted to the client by via the TTP, where the server would send the requested content to the TTP (encoded using M2), and the TTP would then decode and re-encode this content (preferably using encoding scheme M1) and send the encoded response to the client. This would remove the need to encode meta-M3 and to use M3 between the client and server. However, this approach requires additional message exchanges, and as stated earlier, it is preferable to minimize the number of messages transmitted due to concerns of cost and/or bandwidth limitations.

Further note that if the client does not need to encrypt parameters or other information on the GET request, then the message exchanges between the server and TTP are not strictly required. Instead, the client may simply transmit an unencrypted request to the server, which the server will process and send back to the client encrypted according to some scheme M3, which the server then describes to the client using meta-M3 piggy-backed onto the response.

An example of using this second novel piggy-backed key exchange protocol with public key cryptography is:

Client→Server: GET "page", $Enc_{p(TTP)}$("parameters", ID(Client), ID(Server), ID(TTP), N(Client), T)
Server→TTP: $Enc_{p(TTP)}$("parameters", ID(Client), ID(Server), ID (TTP), N(Client), T)
TTP→Server: $Enc_{p(Server)}$("parameters", ID(Client), N(Client), T)
Server→Client: $Enc_k$("content"), $Enc_{p(Client)}$(N(Server)), Cert(Server)

The GET request uses a single set of piggy-backed encrypted information in this embodiment. The information is encrypted by the client using the TTP's public key, and comprises the security-sensitive parameters (such as a subscriber account number and password); identifying information about the client, the server, and the TTP; the client's own nonce, and an optional timestamp. The server takes this encrypted information, and as shown in the second message flow, transmits it unchanged to the TTP. As shown, this corresponds to applying a "null" encoding for M2. (As stated earlier, the server and TTP may have a persistent secure connection already established between them; in this case, the client's encrypted information can be transmitted on this secure connection in the second and third message flows without concern for compromise of the sensitive data.) When application of a second encoding scheme is required for transmitting this data, however, the server would either use a private key it shares with the TTP, or the TTP's public key. Once the TTP has extracted the client's parameters by decryption, it re-encrypts the information using the server's public key (alternatively, using a key shared between the server and TTP). In addition, as shown in the third flow above, the TTP will typically encrypt the client's ID and nonce, and transmit these back to the server. This is beneficial for enabling the server to know with which client these security-sensitive parameters are associated, and for identifying the client to which the server's response is to be transmitted. Once the server receives the TTP's message, it decrypts the content using it's own private key (alternatively, the key shared with the TTP). The server then encrypts the requested content using the shared key k, which, as in the first preferred embodiment, is computed from the client and server nonces. The server also encrypts its nonce using the client's public key. Preferably, the server piggy-backs both the encrypted server nonce and the server's digital certificate onto the client response, as shown in the fourth flow above. As is known in the art, one field typically specified in a digital certificate is an identification of an algorithm to be used when communicating with this certificate's owner; thus, transmission of the server's certificate informs the client of an encoding algorithm that may be used for future transmission to this server. (Alternatively, the server may transmit its identifier instead of its certificate, which the client may then use to retrieve the certificate from a certificate registry or database.)

If the client is able to generate (and propose) message encoding schemes, then the optimization described earlier as pertaining to all four embodiments whereby a new scheme referred to as "Mx" is proposed may be used beneficially in this scenario, in order to reduce the required trust in the TTP. Using this optimization, the abstract message flows described for this embodiment may be replaced by the following (where M4 is used to denote the encoding scheme Mx generated by the client):

Client→Server: GET "page", M4("parameters", ID(Server), . . . ), M1(meta-M4)

Server→TTP: M2(M1(meta-M4))

TTP→Server: M2(meta-M4)

Server→Client: M3("content", . . . ), meta-M3

In other words, the client uses the encoding scheme M1, which it shares with the TTP, to encrypt only the meta-information describing M4, and uses M4 (which is not known to the TTP) to encrypt the security-sensitive parameters, server identification, and other data. This information is then piggy-backed onto the GET request and sent to the server. The server then sends, in the second flow, just the encrypted meta-M4 to the TTP, encrypting it first using the scheme M2 shared between the server and TTP. (As described earlier with reference to M2, if the server and the TTP share a secure persistent connection, then M2 may be null without comprising the security of the information in the second and third message flows.) The TTP decrypts the meta-M4 information supplied by the client's original message, and re-encrypts this using M2, for transmission back to the server (as the third flow of this optimized exchange). The server is then able to decrypt the meta-M4 description to determine M4, and subsequently uses M4 to decrypt the parameters originally sent by the client on the GET request. Finally, the server generates the requested content, encrypts it using (as shown in the fourth flow) some new scheme M3, piggy-backing the description meta-M3 onto the transmission of the encrypted response. Thus as can be seen, the sensitive parameter data is not exposed to the TTP, but is shared only between the client and server. (Alternatively, instead of using a new scheme M3, the server may choose to use the same scheme M4 generated by the client for encrypting the server's response to the client. In this case, meta-data does not need to be piggy-backed onto the content response.)

An example of using this optimization of the second embodiment, where the client is proposing a new scheme M4 using an existing scheme M1, is shown below:

Client→Server: GET "page", $Enc_{N(Client)}$("parameters"), $Enc_{p(TTP)}$(ID(Client), ID(Server), ID(TTP), N(Client), T), Server→TTP: $Enc_{p(TTP))}$(ID(Client), ID(Server), ID(TTP), N(Client), T)

TTP→Server: $Enc_{p(Server)}$(ID(Client), N(Client), T)

Server→Client: $Enc_k$("content"), $Enc_{p(Client)}$(N(Server)), Cert(Server)

By comparing these four messages to the four messages of the exchange which did not use the optimization, it can be seen that the difference in the GET request is moving the parameters out of the data encrypted using the TTP's public key, and into a separately-encrypted field that is now encrypted using the client's nonce as the encryption key. Similarly, the parameters are omitted from the second and third message exchanges. The data sent to the client in the fourth message represents the same information sent when the optimization is not used. As an alternative, the server's certificate does not need to be sent when using this optimization if the server application finds it acceptable for the client to continue communicating by using the TTP as a go-between in the manner that has been described.

Third Preferred Embodiment

In a third scenario, the client may initially use an encoding scheme which it shares with a trusted third party, but not with the server, where the server has no trust (and possibly no shared message encoding scheme) with this TTP. Or, the client may simply believe that the server supports—and will use—a particular encoding scheme proposed by the client, when this is not the case. In this embodiment, an additional request/response pair must be sent between the client and server to achieve a secure message exchange. This request/response pair preferably takes one of two alternative forms, each of which will be described in turn.

In a first aspect of this third embodiment, the request/response pair uses the novel technique disclosed in the U.S. Patent Application titled "Exchanging Supplemental Information Fields Between a Client and a Serve," having Ser. No. 09/415,646, which is assigned to the same assignee and which is incorporated herein by reference (hereinafter, the "referenced patent application". This referenced patent application discloses use of the REDIRECT message of the HTTP protocol (or the equivalent message of another protocol such as WSP), which the server sends to a client in response to a client's request for Web content when the server wishes to request supplemental information for use in fulfilling the request. As disclosed therein, the supplemental information fields are specified in the request header of the REDIRECT message. For purposes of the present invention, the server specifies one or more security-related fields as the requested supplemental information. The novel piggy-backed key exchange protocol of this first aspect of the third preferred embodiment is thus shown abstractly by the sequence:

Client→Server: GET "page", M1(parameters, . . . )

Server→Client: REDIRECT "page", meta-M2, . . .

Client→Server: GET "page", M2("parameters", . . . )

Server→Client: M2("content", . . . )

Here, M1 is the message encoding scheme which may be shared between the client and the TTP. Whereas in the second preferred embodiment the server forwarded the client's encrypted information from the GET request on to a TTP for decryption, in this third embodiment the server is unable or unwilling to send the message to a TTP. (Or, as discussed above, the client may erroneously believe that the server will find M1 acceptable.) Instead, the server sends the REDIRECT message back to the client, along with the piggy-backed meta-M2 information. (Note that according to the referenced patent application, this REDIRECT may specify either a different URL from that in the first GET request or it may specify the same URL. The notation "page" in the second and third message flows above refers to either case.) In effect, the server is disregarding the parameters from the first GET request (which it cannot decrypt, not having the M1 scheme available), and asking the client to try again using M2. This has the effect of proposing a shared message encoding scheme, M2, between the client and server. Upon receiving the REDIRECT message (and assuming the client finds M2 acceptable), the client re-encrypts its parameters, using M2 this time, and re-issues the GET request with its piggy-backed re-encrypted parameters. The server is now able to decrypt the parameters using M2. The server encrypts the requested content, again using M2, and returns this content to the client.

An example of using this first aspect of the third preferred embodiment is:

Client→Server: GET "page", $Enc_{p(TTP)}$("parameters", ID(Client), ID(Server), ID(TTP), N(Client), T)

Server→Client: REDIRECT "page", Cert(Server)

Client→Server: GET "page", $Enc_{p(Server)}$("parameters", ID(Client), N(Client), T)

Server→Client: $Enc_{k(new)}$("content"), $Enc_{p(Client)}$(N(Server))

As in the first-presented example of the second preferred embodiment, the original GET request uses a single set of piggy-backed encrypted information, and again the information is encrypted by the client using the TTP's public key (because it is the TTP with which the client has the shared encoding scheme M1), and comprises similar information. (In the scenario described above where the client erroneously believes that the server supports M1, the first message flows of this third embodiment would substitute the server's public key, or a shared key which the client believes the server can use, for the TTP's public key and would omit the TTP's identifying information.) However, the server's response is now to send a REDIRECT message, along with the server's certificate, back to the client. From this server certificate, the client can determine the server's public key as well as an encryption algorithm (i.e. M2) to use when it re-requests the page (according to the semantics of the REDIRECT message, as defined for the HTTP protocol). Thus, the third message shown in the above exchange indicates that the client now encrypts the security-sensitive information using the server's public key. The server then encrypts the requested content using a new shared key k(new), which is computed using the client and server nonces, as described earlier, and encrypts its nonce using the client's public key. The server piggy-backs the encrypted server nonce onto the encrypted content and transmits this as its response to the client, as shown in the fourth flow above.

In a second aspect of this third preferred embodiment, the REDIRECT message is replaced by an HTTP www-Authenticate header. As defined by the HTTP specification, the www-Authenticate header provides a technique for a server to request additional information from the client for purposes of authentication, before the server will complete the client's request for access to a particular Web page. While the HTTP specification defines a single type of authentication (i.e. "Basic"), it also specifies that the server is free to use any other value, where the use and interpretation of that value is then browser- and server-dependent. According to this aspect of the third preferred embodiment, the value will be a keyword such as "PasswordRedirect," and the header will preferably include a URL to which the client should be redirected when replying to this message. (As stated for the first aspect of this third embodiment, the URL may be the same URL from the first GET request, or it may be a different URL.) In this manner, a URL redirection capability is optionally being tunneled over the HTTP authenticate mechanism. A browser implementing support for this PasswordRedirect keyword will understand, when receiving the www-Authenticate containing this keyword, that the server is using the extension disclosed herein to the existing HTTP authentication mechanism. The browser will then gather the requested credentials, and re-issue the request (in the same manner depicted above for the third message flow of the first aspect), where the URL in this subsequent GET request is now (when specified) taken from the www-Authenticate header.

An example of using this second aspect of the third preferred embodiment is:

Client→Server: GET "page", $Enc_{p(TTP)}$("parameters", ID(Client), ID(Server), ID(TTP), N(Client), T)

Server→Client: www-Authenticate(PasswordRedirect "page"), Cert(Server)

Client→Server: GET "page", $Enc_{p(Server)}$("parameters", ID(Client), N(Client), T)

Server→Client: $Enc_{k(new)}$("content"), $Enc_{p(Client)}$(N(Server))

Note that the third and fourth flows of the exchanges in both aspects of this third embodiment are identical to the flows of the shared key version of the first preferred embodiment, which was defined for the shared-encoding scenario that the client and server have now established by the information transmitted on the REDIRECT or www-Authenticate message.

It is also important to note that when the client encrypts its initial GET request information using the TTP's public key, as illustrated for the second embodiment and both aspects of the third preferred embodiment, the client is not required to verify whether the server to which the GET request is being sent has any trust in (or shared message scheme with) this same TTP. When the server implements support for both the second and third embodiments, the server may choose whether to proceed according to the second embodiment (i.e. by forwarding the encrypted information to the TTP) or according to the third embodiment (by returning a REDIRECT or www-Authenticate message to request the information according to a different, now-shared encoding scheme). Alternatively, it may happen that a particular server implements only one of the second or third embodiment; in that case, the server will respond using the response appropriate to that embodiment.

Fourth Preferred Embodiment

In a fourth scenario, the client does not share an encoding scheme with any other party. This may be the case, for example, on a very minimal client device which has insufficient storage to hold certificates (and therefore message encoding schemes). Or, the client may know that for a particular target server, the parties have no shared encoding scheme. This fourth preferred embodiment has three alternative aspects. In the first and second of these aspects, an additional request/response pair must be sent between the client and server to achieve a secure message exchange, as in the third preferred embodiment. In the first aspect, this request/response pair begins with the server sending a REDIRECT message, and in the second aspect, this pair begins with the server sending a response with a www-Authenticate header which preferably includes a redirect keyword and URL. The manner in which the REDIRECT and www-Authenticate are used for these two aspects is as described above for the two aspects of the third preferred embodiment, and thus the details will not be presented again for this fourth embodiment. The third aspect of this fourth embodiment uses only two message flows, and is described following the discussion of the first and second aspects.

In a first aspect of this fourth embodiment, the request/response pair uses the same novel technique of the referenced patent application, whereby the server sends an HTTP (or WSP) REDIRECT message to a client in response to a client's request for Web content, so that the server can request security-related supplemental information for use in fulfilling the request. The novel piggy-backed key exchange protocol of this first aspect of the fourth preferred embodiment is shown abstractly below:

Client→Server: GET "page", M?, . . .
Server→Client: REDIRECT "page", meta-M
Client→Server: GET "page", M("parameters", . . . )
Server→Client: M("content", . . . )

In the initial GET request, "M?" is some verb or keyword that indicates to the server that the client has no encoding scheme to suggest, and that the server should propose one. Because the client has no way to encode its security-sensitive parameters at this point, it does not transmit the parameters. (Alternatively, an implementation of this aspect may use the absence of parameters to indicate that the client is requesting the server to suggest an encoding scheme. In this situation, "M?" corresponds to omitting any parameter-related information and to the absence of a special verb or keyword.) In response, the server sends a REDIRECT message back to the client, along with the piggy-backed meta-M information. Thus, the server is asking the client to try again using encoding scheme M (to be learned from the meta-M information), which then proposes M as the parties' shared message encoding scheme. Upon receiving the REDIRECT message (and assuming the client finds M acceptable), the client encrypts its parameters using M, and re-issues the GET request which now includes the piggy-backed encrypted parameters. The a server then uses M to decrypt the parameters and to encrypt the requested content, and returns this content to the client as shown in the final flow above.

An example of using this first aspect of the fourth preferred embodiment is:

Client→Server: GET "page", NULL
Server→Client: REDIRECT "page", Cert(Server)
Client→Server: GET "page", $Enc_{p(Server)}$("parameters", ID(Client), N(Client), T)
Server→Client: $Enc_{k(new)}$("content"), $Enc_{p(Client)}$(N(Server))

The keyword "NULL" is used in this example to convey to the server that the client will not send its parameters until it learns, from the server, a message encoding scheme that can be used to transmit the parameters securely. The server provides this information by sending a REDIRECT message, along with the server's certificate, back to the client. (As stated above, from this server certificate, the client can determine the server's public key as well as an encryption algorithm M to use when it re-requests the page.) In an identical manner as described for the corresponding message of the third embodiment (both aspects), the client now encrypts the security-sensitive information using the server's public key. Also identically to the final message of the third embodiment (both aspects), the server then encrypts the requested content using a new shared key k(new); encrypts its nonce using the client's public key; piggy-backs the encrypted server nonce onto the encrypted content; and transmits this as its response to the client.

In a second aspect of this fourth preferred embodiment, the REDIRECT message is replaced by an HTTP www-Authenticate header, in the same manner described above for the third embodiment. An example of using this second aspect of the fourth preferred embodiment is:

Client→Server: GET "page", NULL
Server→Client: www-Authenticate(PasswordRedirect "page"), Cert(Server)
Client→Server: GET "page", $Enc_{p(Server)}$("parameters", ID(Client), N(Client), T)
Server→Client: $Enc_{k(new)}$("content"), $Enc_{p(Client)}$(N(Server))

(As stated above for the first aspect, an implementation of this second aspect may use the absence of parameters to indicate that the client is requesting the server to suggest an encoding scheme.)

As noted with reference to the aspects of the third embodiment, the third and fourth flows of the exchanges in these first two aspects of this fourth embodiment are identical to the shared key version of the flows of the first preferred embodiment, as is appropriate for the shared-encoding scenario that the client and server have now established by the information transmitted on the REDIRECT or www-Authenticate message.

In a third aspect of this fourth preferred embodiment, it may happen that the client does not need to transmit any security-sensitive information with the GET request. In this case, the number of message flows between the client and server according to this piggy-backed key exchange protocol is reduced to two. This exchange is represented abstractly as:

Client→Server: GET "page", "parameters", USE_ANY_M
Server→Client: M("content", . . . ), meta-M In other words, the client indicates on the GET request that the server may use any message encoding scheme. The server then responds by encoding the security-sensitive content using some scheme M, and transmits the meta-M information that will enable the client to use this scheme as well.

An example of using this third aspect is then:

Client→Server: GET "page", "parameters", ID(Client), N(Client), T
Server→Client: $Enc_k$("content"), $Enc_{p(Client)}$(N(Server)), Cert(Server)

As shown by this GET request, the client sends any information pertinent to this request in unencrypted form. The server obtains the client's public key using the provided client identifying information to retrieve the client's certificate (or to otherwise look up the public key). The server encrypts the requested content using session key k, and encrypts its own nonce using the client's public key. (As described earlier, the session key may be derived using a function of the client nonce and the server nonce.) The server piggy-backs its encrypted nonce, as well as its certificate (or an identifier which can be used to retrieve its certificate), onto the encrypted content and sends this to the client. The client then uses the server's certificate to learn the message encoding scheme M that the server has used, thus enabling the client to use this scheme for decryption. Thus, the client and server have established a secure connection, and exchanged data securely on this connection, using no more messages than required in the current art for a non-secure data exchange.

While several preferred embodiments of the present invention have been described, additional variations and modifications may occur to those skilled in the art once they learn of the basic inventive concepts. Therefore, it is intended that the appended claims shall be construed to include both the preferred embodiment and all such variations and modifications as fall within the spirit and scope of the invention.

We claim:

1. In a computing environment having a connection to a network, a computer program product embodied on one or more computer readable media for establishing a secure, connection between a client application and a server application using existing message types, said computer program product comprising:

computer-readable program code means for sending a first content request from said client application to said server application, wherein said first content request uses a first existing message type onto which is piggy-backed first security data, whereby said client application proposes a first message encoding scheme for use in establishing said secure, connection;

computer-readable program code means for sending a response, from said server application to said client application responsive to receiving said first content request, wherein said response uses a second existing message type onto which is piggy-backed second security data, whereby said server application proposes a second message encoding scheme for use in establishing said secure, connection instead of said first message encoding scheme;

computer-readable program code means for sending a subsequent content request from said client application to said server application, response to receiving said response, wherein said subsequent content request uses said first existing message type to which is piggy-backed third security data, whereby said client application provides said third security data for use by said server application in establishing said secure, connection; and computer-readable program code means for sending a content response, from said server application to said client application responsive to receiving said subsequent content request, wherein: (1) at least a portion of content included in said content response is encrypted; and (2) said content response uses a third existing message type onto which is piggy-backed fourth security data, whereby said server application provides said fourth security data for use by said client application in establishing said secure, connection.

2. The computer program product according to claim 1, wherein said first existing message type is a HyperText Transfer Protocol (HTTP) GET message, said second existing message type is an HTTP REDIRECT message, and said third existing message type is a response to said HTTP GET message.

3. The computer program product according to claim 1, wherein said first existing message type is a HyperText Transfer Protocol (HTTP) POST message, said second existing message type is an HTTP REDIRECT message, and said third existing message type is a response to said HTTP POST message.

4. The computer program product according to claim 1, wherein said first existing message type is a Wireless Session Protocol (WSP) GET message, said second existing message type is a WSP REDIRECT message, and said third existing message type is a response to said WSP GET message.

5. The computer program product according to claim 1, wherein said first existing message type is a Wireless Session Protocol (WSP) POST message, said second existing message type is a WSP REDIRECT message, and said third existing message type is a response to said WSP POST message.

6. The computer program product according to claim 1, wherein:

said first content request requests a security-sensitive page from said server application, wherein said first content request further comprises an identifier of said security-sensitive page;

said response sends a redirection message from said server application to said client application, wherein said redirection message comprises a redirected identifier of said security-sensitive page;

said subsequent content request sends a subsequent request for said security-sensitive page from said server application, wherein said subsequent request further comprises said redirected identifier of said security-sensitive page; and said content response sends a response to said subsequent content request to said client application, wherein said encrypted portion is encrypted using a session key generated by said server application.

7. The computer program product according to claim 6, wherein:

said first security data is encrypted using a public key of a trusted third party (TTP);

said second security data further comprises a security certificate of said server application;

said third security data is encrypted using a public key of said server application; and said fourth security data further comprises a nonce of said server application, encrypted using a public key of said client application.

8. The computer program product according to claim 6, wherein:

said first security data is encrypted using a public key of a trusted third party (TTP);

said second security data further comprises an identification of said server application;

said third security data is encrypted using a public key of said server application; and said fourth security data further comprises a nonce of said server application, encrypted using a public key of said client application.

9. The computer program product according to claim 7, wherein said first security data comprises: zero or more parameters to be used in responding to said subsequent content request; an identification of said client application; an identification of said server application; an identification of said TTP; a client nonce; and optionally including a timestamp.

10. The computer program product according to claim 9, wherein said third security data comprises: zero or more parameters to be used in responding to said first content request; said identification of said client application; said client nonce; and said timestamp when said first set includes said timestamp.

11. The computer program product according to claim 6, wherein said redirected identifier of said security-sensitive page is identical to said identifier of said security-sensitive page.

12. The computer program product according to claim 9, wherein:
said first security data is encrypted using said public key of said server application instead of said public key of said TTP; and
said first security data omits said identification of said TTP.

13. The computer program product according to claim 9, wherein:
said first security data is encrypted using said a session key known to said client application instead of said public key of said TTP; and
said first security data said identification of said TTP.

14. The computer program product according to claim 1, wherein:
said first content request requests a security-sensitive page from said server application, wherein said first content request further comprises an identifier of said security-sensitive page;
said response sends an authentication message from said server application to said client application;
said subsequent content request sends a subsequent request for said security-sensitive page from said server application; and
said content response sends a response to said subsequent content request to said client application, wherein said encrypted portion is encrypted using a session key generated by said server application.

15. The computer program product according to claim 14, wherein said authentication message comprises a redirect keyword and a redirected identifier of said security-sensitive page, and wherein said subsequent content request further comprises said redirected identifier of said security-sensitive page.

16. A system for establishing a secure, connection between a client application and a server application using existing message types in a computing environment having a connection to a network, said system comprising:
means for sending a first content request from said client application to said server application, wherein said first content request uses a first existing message type onto which is piggy-backed first security data, whereby said client application proposes a first message encoding scheme for use in establishing said secure, connection;
means for sending a response, from said server application to said client application responsive to receiving said first content request, wherein said response uses a second existing message type onto which is piggy-backed second security data, whereby said server application proposes a second message encoding scheme for use in establishing said secure, connection instead of said first message encoding scheme;
means for sending a subsequent content request from said client application to said server application, responsive to receiving said response, wherein said subsequent content request uses said first existing message type onto which is piggy-backed third security data, whereby said client application provides said third security data for use by said server application in establishing said secure, connection; and
means for sending a content response, from said server application to said client application response to receiving said subsequent content request, wherein: (1) at least a portion of content included in said content response is encrypted; and (2) said content response uses a third existing message type onto which is piggy-backed fourth security data, whereby said server application provides said fourth security data for use by said client application in establishing said secure, connection.

17. The system according to claim 16, wherein said first existing message type is a HyperText Transfer Protocol (HTTP) GET message, said second existing message type is an HTTP REDIRECT message, and said third existing message type is a response to said HTTP GET message.

18. The system according to claim 16, wherein said first existing message type is a HyperText Transfer Protocol (HTTP) POST message, said second existing message type is an HTTP REDIRECT message, and said third existing message type is a response to said HTTP POST message.

19. The system according to claim 16, wherein said first existing message type is a Wireless Session Protocol (WSP) GET message, said second existing message type is a WSP REDIRECT message, and said third existing message type is a response to said WSP GET message.

20. The system according to claim 16, wherein said first existing message type is a Wireless Session Protocol (WSP) POST message, said second existing message type is a WSP REDIRECT message, and said third existing message type is a response to said WSP POST message.

21. The system according to claim 16, wherein:
said first content request requests a security-sensitive page from said server application, wherein said first content request further comprises an identifier of said security-sensitive page;
said response sends a redirection message from said server application to said client application, wherein said redirection message comprises a redirected identifier of said security-sensitive page;
said subsequent content request sends a subsequent request for said security-sensitive page from said server application, wherein said subsequent request further comprises said redirected identifier of said security-sensitive page; and
said content response sends a response to said subsequent content request to said client application, wherein said encrypted portion is encrypted using a session key generated by said server application.

22. The system according to claim 21, wherein:
said first security data is encrypted using a public key of a trusted third party (TTP);
said second security data further comprises a security certificate of said server application;
said third security data is encrypted using a public key of said server application; and
said fourth security data further comprises a nonce of said server application, encrypted using a public key of said client application.

23. The system according to claim 21, wherein:
said first security data is encrypted using a public key of a trusted third party (TTP);
said second security data further comprises an identification of said server application;
said third security data is encrypted using a public key of said server application; and
said fourth security data further comprises a nonce of said server application, encrypted using a public key of said client application.

24. The system according to claim 22, wherein said first security data comprises: zero or more parameters to be used responding to said first content request; an identification of said client application; an identification of said server application; an identification of said TTP; a client nonce; and optionally including a timestamp.

25. The system according to claim 24, wherein said third security data comprises: zero or more parameters to be used in responding to said subsequent content request; said identification of said client application; said client nonce; and said timestamp when said first set includes said timestamp.

26. The system according to claim 21, wherein said redirected identifier of said security-sensitive page is identical to said identifier of said security-sensitive page.

27. The system according to claim 24, wherein:
said first security data is encrypted using said public key of said server application instead of said public key of said TTP; and
said first security data omits said identification of said TTP.

28. The system according to claim 24, wherein;
said first security data is encrypted using said a session key known to said client application instead of said public key of said TTP; and
said first security data omits said identification of said TTP.

29. The system according to claim 16, wherein:
said first content request requests a security-sensitive page from said server application, wherein said first content request further comprises an identifier of said security-sensitive page;
said response sends an authentication message from said server application to said client application;
said subsequent content request sends a subsequent request for said security-sensitive page from said server application; and
said content response sends a response to said subsequent content request to said client application, wherein said encrypted portion is encrypted using a session key generated by said server application.

30. The system according to claim 29, wherein said authentication message comprises a redirect keyword and a redirected identifier of said security-sensitive page, and wherein said subsequent content request further comprises said redirected identifier of said security-sensitive page.

31. A method for establishing a secure, connection between a client application and a server application using existing message types in a computing environment having a connection to a network, said method comprising the steps of:
sending a first content request from said client application to said server application, wherein said first content request uses a first existing message type onto which is piggy-backed first security data, whereby said client application proposes a first message encoding scheme for use in establishing said secure, connection;
sending a response, from said server application to said client application responsive to receiving said first content request, wherein said response uses a second existing message type onto which is piggy-backed second security data, whereby said server application proposes a second message encoding scheme for use in establishing said secure, connection instead of first message encoding scheme;
sending a subsequent content request from said client application to said server application, responsive to receiving said response, wherein said subsequent content request uses said first existing message type onto which is piggy-backed third security data, whereby said client application provides said third security data for use by said server application in establishing said secure, connection; and
sending a content response, from said server application to said client application responsive to receiving said subsequent content request, wherein: (1) at least a portion of content included in said content response is encrypted; and (2) said content response uses a third existing message type onto which is piggy-backed fourth security data, whereby said server application provides said fourth security data for use by said client application in establishing said secure, connection.

32. The method according to claim 31, wherein said first existing message type is a HyperText Transfer Protocol (HTTP) GET message, said second existing message type is an HTTP www-Authenticate message, and said third existing message type is a response to said HTTP GET message.

33. The method according to claim 31, wherein said first existing message type is a HyperText Transfer Protocol (HTTP) POST message, said second existing message type is an HTTP www-Authenticate message, and said third existing message type is a response to said HTTP POST message.

34. The method according to claim 31, wherein said first existing message type is a Wireless Session Protocol (WSP) GET message, said second existing message type is a WSP www-Authenticate message, and said third existing message type is a response to said WSP GET message.

35. The method according to claim 31, wherein said first existing message type is a Wireless Session Protocol (WSP) POST message, said second existing message type is a WSP www-Authenticate message, and said third existing message type is a response to said WSP POST message.

36. The method according to claim 31, wherein:
said first content request requests a security-sensitive page from said server application, wherein said first content request further comprises an identifier of said security-sensitive page;
said response sends an authentication message from said server application to said client application;
said subsequent content request sends a subsequent request for said security-sensitive page from said server application; and
said content response sends a response to said subsequent content request to said client application, wherein said encrypted portion is encrypted using a session key generated by said server application.

37. The method according to claim 36, wherein said authentication message comprises a redirect keyword and a redirected identifier of said security-sensitive page, and wherein said subsequent request further comprises said redirected identifier of said security-sensitive page.

38. The method according to claim 36, wherein:
said first security data is encrypted using a public key of a trusted third party (TTP);
said second security data further comprises a security certificate of said server application;
said third security data is encrypted using a public key of said server application; and
said fourth security data further comprises a nonce of said server application, encrypted using a public key of said client application.

39. The method according to claim 36, wherein:
said first security data is encrypted using a public key of a trusted third party (TTP);
said second security data further comprises an identification of said server application;
said third security data is encrypted using a public key of said server application; and
said fourth security data further comprises a nonce of said server application, encrypted using a public key of said client application.

40. The method according to claim 38, wherein said first security data comprises: zero or more parameters to be used in responding to said first content request; an identification of said client application; an identification of said server application; an identification of said TTP; a client nonce; and optionally including a timestamp.

41. The method according to claim 39, wherein said first security data comprises: zero or more parameters to be used in responding to said first content request; an identification of said client application; an identification of said server application; an identification of said TTP; a client nonce; and optionally including a timestamp.

42. The method according to claim 40, wherein said third security data comprises: zero or more parameters to be used in responding to said subsequent content request; said identification of said client application; said client nonce; and said timestamp when said first set includes said timestamp.

43. The method according to claim 41, wherein said third security data comprises: zero or more parameters to be used in responding to said subsequent content request; said identification of said client application; said client nonce; and said timestamp when said first set includes said timestamp.

44. The method according to claim 37, wherein said redirected identifier of said security-sensitive page is not identical to said identifier of said security-sensitive page.

45. The method according to claim 40, wherein:
said first security data is encrypted using said public key of said server application instead of said public key of said TTP; and
said first security data omits said identification of said TTP.

46. The method according to claim 41, wherein:
said first security data is encrypted using said a session key known to said client application instead of said public key of said TTP; and
said first security data omits said identification of said TTP.

47. The method according to claim 31, wherein:
said first content request requests a security-sensitive page from said server application, wherein said first content request further comprises an identifier of said security-sensitive page;
said response sends a redirection message from said server application to said client application, wherein said redirection message comprises a redirected identifier of said security-sensitive page;
said subsequent content request sends a subsequent request for said security-sensitive page from said server application, wherein said subsequent request further comprises said redirected identifier of said security-sensitive page; and
said content response sends a response to said subsequent content request to said client application, wherein said encrypted portion is encrypted using a session key generated by said server application.

48. The method according to claim 31, wherein said first security data comprises a nonce of said client application and is encrypted using a public key of said TTP.

49. The method according to claim 48, wherein said first security data further comprises zero or more parameters supplied by said client application for said server application to use in responding to said first content request, an identification of said client application, an identification of said server application, an identification of said TTP, and optionally a timestamp.

50. The method according to claim 31, wherein said first security data comprises a nonce of said client application and is encrypted using a public key of said server application.

51. The method according to claim 50, wherein said first security data further comprises zero or more parameters supplied by said client application for said server application to use in responding to said first content request, an identification of said client application, an identification of said server application, and optionally a timestamp.

52. The method according to claim 31, wherein said first security data comprises a nonce of said client application and is encrypted using a session key not known to said server application.

53. The method according to claim 52, wherein said fist security data further comprises zero or more parameters supplied by said client application for said server application to use in responding to said first content request, an identification of said client application, an identification of said server application, and optionally a timestamp.

54. The method according to claim 31, wherein said second security data comprises a security certificate of said server application.

55. The method according to claim 31, wherein said second security data comprises an identification of said server application which said client application can use to locate a security certificate of said server application.

56. The method according to claim 31, wherein said third security data comprises a nonce of said client application and is encrypted using a public key of said server application, wherein said public key was obtained using a security certificate identified in, or provided in, said second security data.

57. The method according to claim 56, wherein said third security data further comprises zero or more parameters supplied by said client application for said server application to use in responding to said subsequent content request, an identification of said client application, and optionally a timestamp.

58. The method according to claim 56, further comprising the step of decrypting said third security data, responsive to receiving said subsequent content request, using a private key of said server application that corresponds to said public key.

59. The method according to claim 56, wherein said third security data further comprises one or more parameters supplied by said client application for said server application to use in responding to said subsequent content request, an identification of said client application, and optionally a timestamp and further comprising the steps of:
decrypting said third security data, responsive to receiving said subsequent content request, using a private key of said server application that corresponds to said public key; and using said one or more deters from said decrypted third security data when creating said content.

60. The method according to claim 31, wherein:

said fourth security data further comprises a nonce of said server application and is encrypted using a public key of said client application; and said encrypted portion is encrypted using a session key created from said server nonce and a client nonce contained in said third security data.

61. The method according to claim 60, further comprising the steps of:

decrypting said fourth security data, responsive to receiving said content response, using a private key of said client application that corresponds to said public key of said client application;

using said server nonce from said decrypted fourth security data, along with said client nonce, to recreate said session key; and using said recreated session key to decrypt said encrypted portion.

* * * * *